2,924,580

DIVINYL BENZENE DIOXIDE COMPOSITIONS

Benjamin Phillips, Charleston, Charles W. McGary, Jr., South Charleston, and Charles T. Patrick, Jr., St. Albans, W. Va., assignors to Union Carbide Corporation, a corporation of New York No Drawing. Application August 8, 1957
Serial No. 676,913

12 Claims. (Cl. 260—2)

This invention relates to epoxide compositions. In one aspect this invention relates to the production of polymers of divinylbenzene dioxide. In another aspect this invention relates to polymerizable, curable compositions comprising divinylbenzene dioxide and to the partially cured and cured compositions resulting therefrom.

The polymerizable compositions of this invention are extremely low-viscosity, homogeneous liquids at room temperature, e.g., 15–20 centipoises at 25° C. These compositions can be easily handled in such resin-forming operations as coating, laminating, bonding, molding, casting, potting, calendering, and the like. They are capable of accepting solid materials, such as fillers and pigments, for providing various effects in physical properties and coloration. With or without such added solid materials, they can be made to fill small intricacies of molds without the necessity of applying high pressures or heating to high temperatures, although such measures can be employed, if desired. The compositions also can be easily spread, brushed or sprayed by many techniques available in the paint, lacquer, and varnish industries for making coatings and finishes. The polymerizable compositions are capable of being accurately shaped by molds having intricate molding surfaces and cured to resins carrying exact details of such molding surfaces. The polymerizable compositions can be also advantageously employed in the potting and encapsulating of fragile electrical equipment such as electronic components.

The cured compositions, i.e., resins, vary from viscous liquids to tough, infusible solids depending, to an extent, upon such factors as cure time, cure temperature, catalyst employed, concentration of catalyst, and other considerations. In one aspect the cured compositions of this invention are hard, transparent, water-resistant, bubble-free solids. In another aspect the cured compositions are hard, tough, transparent, water-resistant, scratch-resistant, bubble-free, infusible solids, which are insoluble in the common organic vehicles such as acetone, methyl ethyl ether and the like. These resins can be machined to desired shapes and configurations and can be polished to provide appealing finishes. They can be made into articles having advantageous physical properties at high temperatures.

Commercial epoxide resins such as those prepared from polyglycidyl ethers and catalytic hardeners such as sulfuric acid suffer from several disadvantages. Among such disadvantages can be listed the high viscosity of the curable systems, e.g., of the order of 9,000 to 15,000 centipoises at 25° C., which necessitates the use of special handling techniques for the preparation of bubble-free castings and operations involving the preparation of laminates and the encapsulation of electrical components. In addition, many of the commercial systems as the type described above possess slow cure rates. Those systems with a low rate of cure require long and strenuous cure cycles for obtaining optimum resin properties; those systems having a high rate of cure result in high exotherms causing the formation of bubbles and cracks in the resin products.

As stated previously, the curable, polymerizable compositions of this invention are extremely mobile liquids possessing viscosities as low as 15 to 20 centipoises at approximately 25° C., and they are particularly capable of being easily prepared and conveniently applied to form bubble-free resins. These curable compositions can be readily homogenized at room temperatures and below by relatively simple expedients such as by stirring. They can be subsequently cured at room temperature, if desired, to give uniform resins.

The curable, polymerizable compositions of this invention also can be partially reacted at elevated temperatures to form viscous liquids or soft gels which on cooling, for example, to room temperatures can be powdered or granulated and dissolved in a suitable organic solvent such as, for example, xylene or ethyl acetate and applied as heat-curable coatings. These partially reacted curable compositions can be also used as molding powder compositions which can be converted to infusible products by the application of heat and pressure.

Accordingly, one or more of the following objects will be achieved by the practice of this invention.

It is an object of this invention to prepare novel curable, partially cured and cured compositions comprising divinylbenzene dioxide and catalyst. It is another object of this invention to prepare novel curable compositions comprising divinylbenzene dioxide and catalyst which are mobile liquids having viscosities as low as 15 to 20 centipoises at 25° C. It is a further object of this invention to prepare novel curable and partially cured compositions comprising divinylbenzene dioxide and catalyst which when dissolved in a suitable organic solvent are useful in the fields of coatings, adhesives, and the like. A still further object of this invention is to prepare novel intermediate reaction products resulting from the partial reaction of a composition comprising divinylbenzene dioxide and catalyst. A yet further object of this invention is directed to the preparation of curable and cured compositions comprising divinylbenzene dioxide and catalyst having incorporated therein fillers, pigments and the like. Numerous other objects of the present invention will become apparent to those skilled in the art from a consideration of the instant specification.

In one embodiment, this invention is directed to curable, polymerizable compositions comprising divinylbenzene dioxide characterized by the following formula:

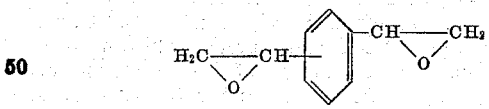

and catalyst described hereinafter. Any of the three isomeric forms of divinylbenzene dioxide, i.e., ortho-, meta-, or para-divinylbenzene dioxide, or mixtures thereof, can be employed as starting material for the preparation of the novel compositions of this invention.

Divinylbenzene dioxide is not a new compound. One preferred method of preparing divinylbenzene dioxide is the reaction of ortho-, meta-, or para-divinylbenzene with an excess of peracetic acid solution in an inert solvent such as acetone or ethyl acetate at approximately 70° C., followed by isolation of the diepoxide product by fractional distillation. Other modes of preparing divinylbenzene dioxide are more fully described in the literature.

The catalysts contemplated include, among others, the strong mineral acids such as sulfuric acid, perchloric acid, phosphoric acid and the like; partial esters of phosphoric acid such as dimethyl dihydrogen pyrophosphate and the like; the sulfonic acids such as ethylsulfonic acid, benzenesulfonic acid, lower alkyl-substituted aromatic sulfonic acids, e.g., toluenesulfonic acid, and the like; the metal halide Lewis acids such as boron trifluoride, stannic chloride, aluminum chloride, zinc chloride, ferric chloride, boron trifluoride-1,6-hexanediamine complex, boron trifluoride-mono ethylamine complex, boron trifluoride-piperidine complex, boron trifluoride-dimethyl ether complex, boron trifluoride-diethyl ether complex, and the like; the alkali metal hydroxides such as sodium hydroxide, potassium hydroxide and the like; the quaternary ammonium compounds such as benzyltrimethylammonium hydroxide, tetramethylammonium hydroxide and the like; tertiary amines such as alpha-methylbenzyldimethylamine, triethylamine, dimethylaminophenol, 2,4,6-tris(dimethylaminomethyl)phenol, and the like.

By the term "polymerization catalyst" as referred to hereinafter in the disclosure, including the appended claims, is meant those catalysts exemplified above, i.e., strong mineral acids, sulfonic acids, metal halide Lewis acids, alkali metal hydroxides, quaternary ammonium compounds, and tertiary amines.

Uniform dispersions of catalyst in the system comprising divinylbenzene dioxide prior to curing have been found to be desirable in order to minimize local curing around the catalyst particles. Agitation of the system comprising divinylbenzene dioxide as the catalyst is added is sufficient when the catalyst is miscible with said diepoxide. Alternatively, the catalyst can be added to the system and the resulting mixture agitated to obtain homogeneity thereof. When the components, i.e., catalyst and divinylbenzene dioxide, are immiscible, the catalyst can be added as a solution in an organic solvent. Typical solvents for the catalysts include organic ethers, e.g., diethyl ether, dipropyl ether and the like; organic esters, e.g., methyl acetate, ethyl propionate, and the like; organic ketones, e.g., acetone, cyclohexanone and the like; organic alcohols, e.g., methanol, propylene glycol and the like. In addition, water can be used as a solvent for the inorganic acid and inorganic base catalysts.

The concentrations of the catalytic hardeners, i.e., polymerization catalysts, can vary over a wide range. The catalyst is employed in catalytic quantities, and, in general, a catalyst concentration in the range from about 0.005 to 25.0 weight percent, and higher, based on the weight of the diepoxide, has been found to be effective. A catalyst concentration in the range from about 0.01 to 15.0 weight percent is preferred.

The curable compositions comprising divinylbenzene dioxide and polymerization catalyst therefor can be heated to a temperature in the range from about 10° C. to about 250° C., for a period of time sufficient to produce hard, infusible resins. Temperatures higher than 250° C. can be employed although some discoloration which may not be desired may be brought about in the resins thus formed. A temperature range from about 25° C. to about 200° C. is preferred. The time for effecting the complete cure will be governed to an extent, on several factors such as the particular catalyst employed, the quantity of catalyst used, the temperature for effecting the cure, and other considerations. In general, the cure period will vary from several minutes to several days, e.g. from 5 minutes to 10 days, and longer, depending upon the correlation of such factors as noted above.

A higher curing temperature generally will provide a resin in less time than a lower curing temperature. One desirable method is to heat the curable compositions comprising divinylbenzene dioxide and catalyst to a temperature within the range from about 25° C. to 150° C. to first partially cure the composition. A temperature from about 100° C. to 200° C. then can be used to complete the cure. However, any one or combination of two or more temperatures within the specified range of 10° C. to 250° C. can be employed, if desired, to effect the full cure.

It is evident, therefore, that another embodiment of this invention is directed to cured compositions comprising divinylbenzene dioxide and polymerization catalyst. The cured compositions are, in effect, homopolymers of divinylbenzene dioxide characterized as having recurring interconnected units of the following structural formula:

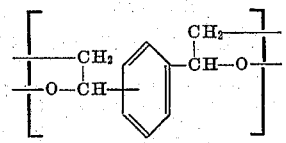

While not wishing to be bound by any particular theory or mechanics of reaction, it is believed that the curing reaction involves the etherification of epoxy groups,

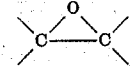

to form carbon to oxygen to carbon bonds linking and cross-linking the monomeric molecules. It is believed that the carbon to oxygen to carbon linkages because of their stability and resistance to many chemical reagents are to a large degree responsible for valuable physical properties, e.g., toughness, heat strength, resistance to organic solvents and the like, of these resins. Furthermore, it is believed that the presence of cyclic groups serves to improve the load carrying capabilities of these resins at high temperatures.

Another embodiment of this invention is directed to novel partially cured compositions, i.e., intermediate reaction products resulting from the partial cure of the curable compositions comprising divinylbenzene dioxide and polymerization catalyst. The curable compositions of this invention can be heated until a viscous liquid or a soft gel is formed, and subsequently allowing the composition to cool to room temperature. The resulting product can be dissolved in a suitable organic solvent, e.g., xylene, methyl isobutyl ketone, butyl acetate, toluene, ethyl acetate, amyl acetate, and the like, and applied as surface coating which can be subsequently heat cured to hard, tough, scratch-resistant coatings.

The proportion of partially cured resin to solvent will depend on various factors such as the particular mixture being cured, the degree or extent of the partial cure, the particular organic solvent employed, and other considerations. In general, a solution comprising from about 10 to about 90 weight percent of partially cured resin, based on the total weight of partially cured resin and solvent, is suitable; from about 40 to 70 weight percent of partially cured resin, based on the total weight of partially cured resin and solvent, is preferred. Moreover, the uncured compositions can be dissolved in the solvents exemplified above and applied to surfaces and subsequently heat cured to form hard, tough coatings. Should the solution comprising the uncured or partially cured compositions tend to "run" when applied to the surface, a conventional wetting agent and/or thixotropic agent can be added to the solution to insure a more uniform coating on the surface.

Other useful compositions, and resins therefrom, having utility in the fields of coating, laminating, bonding, molding, potting, calendering, and the like, can be prepared from divinylbenzene dioxide admixed with various reactive hardening agents. A brief summary of these useful compositions, and resins therefrom, is as follows:

(1) Curable, partially cured, and cured compositions can be prepared from admixtures comprising (a) divinylbenzene dioxide, (b) a polycarboxylic acid compound in an amount having y carboxyl equivalents of acid compound per epoxy equivalent of diepoxide, and (c) a polycarboxylic acid anhydride in an amount having x carboxyl equivalents of anhydride per epoxy equivalent of said diepoxide, wherein y is a number in the range from about 0.3 to about 1.25, preferably from about 0.3 to about 1.0; x is a number in the range from 0.0 to 0.75, preferably from 0.0 to 0.5; the sum of $y+x$ is not greater than about 1.25, preferably not greater than about 1.0; and $y/x$ is less than 1.0. Illustrative polycarboxylic acid compounds which can be employed include aliphatic, aromtic and cycloaliphatic polycarboxylic acids, e.g., oxalic acid, malonic acid, glutaric acid, maleic acid, suberic acid, citraconic acid, 1,2-cyclohexanedicarboxylic acid, phthalic acid, 1,8-naphthalenedicarboxylic acid, 3-carboxycinnamic acid, 1,2,4-hexanetricarboxylic acid, 1,2,4-benzenetricarboxylic acid, and the like; polycarboxy polyesters, i.e., polyesters containing more than one carboxy group per molecule, such as polycarboxylic acids of the type exemplified above, or the corresponding anhydrides, esterified with polyhydric alcohols. Polycarboxylic acid anhydrides which can be employed as modifiers include the anhydrides of the corresponding polycarboxylic acids of those illustrated above, e.g., maleic anhydride, chlorendic anhydride, adipic anhydride, 1,2-naphthalic anhydride, citraconic anhydride, and the like. It will be noted that the polycarboxylic acid compound is a major component of the system. Also, the term "carboxyl equivalent" designates the number of carboxyl groups contained in one mol of polycarboxylic acid compound or polycarboxylic acid anhydride. The term "epoxy equivalent" represents the number of epoxy groups,

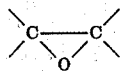

contained in one mol of epoxide compound.

(2) Curable, partially cured, and cured compositions can be prepared from admixtures comprising (a) divinylbenzene dioxide, (b) a polycarboxylic acid anhydride in an amount having $x$ carboxyl equivalents of anhydride per epoxy equivalent of diepoxide, and (c) a polycarboxylic acid compound in an amount having $y$ carboxyl equivalents of acid compound per epoxy equivalent of diepoxide, wherein $x$ is a number in the range from about 0.2 to 3.0, preferably from about 0.4 to 2.0; $y$ is a number in the range from 0.0 to 1.0; the sum of $x$ plus $y$ is not greater than 3.0, preferably not greater than 2.0; and $x/y$ is at least 1.0. Illustrative polycarboxylic acid anhydrides and polycarboxylic acid compound modifiers are exemplified in section (1) above. It will be noted that the polycarboxylic acid anhydride is a major component of this system.

(3) Curable, partially cured, and cured compositions also can be prepared from admixtures comprising (a) divinylbenzene dioxide and (b) a polyfunctional amine, i.e., an amine having at least two active amino hydrogen atoms which can be on the same nitrogen atom or different nitrogen atoms, in an amount so as to provide from about 0.2 to 5.0 amino hydrogen atoms per epoxy group, and preferably from about 0.3 to 3.0 amino hydrogen atoms per epoxy group. Illustrative polyfunctional amines include 2-ethylhexylamine, aniline, phenethylamine, cyclohexylamine, 2-aminophenol, 1,3-diamino-2-propanol, butylenediamine, dipropylenetriamine, guanidine, p,p-sulfonyldiamine, and the like.

(4) Curable, partially cured, and cured compositions can be prepared from admixtures comprising (a) divinylbenzene dioxide, and (b) polyols, i.e., an organic compound having at least two hydroxyl groups which are alcoholic hydroxyl groups, phenolic hydroxylic groups, or both alcoholic and phenolic hydroxyl groups, e.g., aliphatic and cycloaliphatic polyalcohols, and polyhydric phenols. These compositions can be further modified by incorporating therein a polycarboxylic acid compound or polycarboxylic acid anhydride such as those illustrated in section (1) above. It is pointed out that the polyol is a major component as compared with the modifier. Typical polyols which can be employed included, among others, ethylene glycol, diethylene glycol, glycerol, polypropylene glycols, butanediol, triethanolamine, pentaerythritol, trimethylolethane, bis (4-hydroxyphenyl) methane, inositol, sorbitol, trimethylolphenol, resorcinol, pyrogallol, hydroquinone, 1,8-naphthalenediol, 2,4,6-trimethylolphenyl allyl ether, cyclohexanediol, and the like. The polycarboxylic acid compound and polycarboxylic acid anhydride which can be employed as modifiers include those exemplified in section (1) above.

(5) Curable, partially cured, and cured compositions can be prepared from admixtures comprising (a) divinylbenzene dioxide, (b) a polycarboxylic acid compound such as those illustrated in section (1) above, and (c) a polyol of the type previously exemplified in section (4). In these systems, the polycarboxylic acid compound is a major component as compared with the polyol.

(6) Curable, partially cured, and cured compositions can be prepared from admixtures comprising divinylbenzene dioxide and any of the following classes of compounds, namely, (a) polythiols such as the sulfur analogue of the polyols listed in section (4) above; (b) phenol-aldehyde condensates; (c) urea-aldehyde condensates; or (d) melamine-aldehyde condensates.

In the following illustrative examples, Barcol hardness values were determined by the use of Barcol Impressor GYZJ-934-1 at a temperature of 25° C. The divinylbenzene dioxide used in the following examples ranged in purity from 60.0 to 84.2 weight percent with the impurity generally being ethylstyrene oxide. The proportions indicated in certain examples were calculated on the basis of purity of the diepoxide as determined by the pyridine hydrochloride method of analysis. Unless otherwise indicated the examination or description of the resins were conducted at room temperature i.e., 25° C.

EXAMPLE 1

A mixture comprising 1.0 gram of divinylbenzene dioxide of 74 weight percent purity and 0.1 gram of 2,4,6-tris(dimethylaminomethyl)phenol was prepared. The mixture was heated for 20 minutes at 120° C at which time gelation occurred. The temperature was maintained at 120° C. for 3 hours plus an additional 6 hours at 160° C. There was obtained an amber colored, tough resin.

EXAMPLE 2

A mixture was prepared from 1.0 gram of divinylbenzene of 74 weight percent and 0.1 gram of 2,4,6-tris-(dimethylaminomethyl)phenol. The resulting mixture was heated to 26° C. with gelation occurring after 7-16 hours. The temperature was maintained at 26° C. for 100 hours plus an additional 6 hours at 160° C. There was obtained an amber colored, tough resin.

EXAMPLE 3

A mixture comprising 1.0 gram of divinylbenzene dioxide of 74 weight percent purity and 0.004 gram of potassium hydroxide (added as a 17.2 weight percent solution in ethylene glycol) was prepared. The resulting mixture was heated to 120° C. with gelation occurring within 1 hour. This mixture was maintained at 120° C. for 3 hours plus an additional 6 hours at 160° C. There was obtained an amber colored, tough resin.

EXAMPLE 4

A mixture comprising 1.0 gram of divinylbenzene dioxide of 74 weight percent purity and 0.001 gram of sulfuric acid (added as a 5 weight percent solution in water) was prepared. Gelation occurred after heating this mixture to 26° C. for 100 hours plus an additional 6 hours at 160° C. There was obtained an amber colored, tough resin having a Barcol hardness of 51,

EXAMPLES 5–14

Ten mixtures, each containing 1.0 gram of divinylbenzene dioxide of 74 weight percent purity admixed with various proportions of benzyldimethylamine catalyst were prepared. With the exception of Examples 7 and 8, the resulting mixtures were allowed to stand at room temperature for 72 hours during which time gelation usually occurred. Examples 7 and 8 were heated to 120° C. with gelation occurring at this temperature. All of the mixtures were subsequently post cured at 120° C. for 7.5 to 11 hours plus an additional 6 hours at 160° C. The pertinent data and results are set out in Table I below:

Table I

| Example Number | Benzyldimethylamine Drops | Benzyldimethylamine Grams | Gel Time, Hours, °C. | Cure,[3] Hours, °C. | Resin Description |
|---|---|---|---|---|---|
| 5 | [1]1 | 0.001 | No gel, 70 hrs. @ 26°. | 11 hrs. @ 120° | Viscous liquid. |
| 6 | [2]1 | 0.0025 | No gel, 70 hrs. @ 26°. | 11 hrs. @ 120° | Do. |
| 7 | 1 | 0.02 | 1.75 hrs. @ 120° | 7.5 hrs. @ 120° | Hard. |
| 8 | 2 | 0.04 | 1.25 hrs. @ 120° | 7.5 hrs. @ 120° | Do. |
| 9 | 3 | 0.06 | 7–70 hrs. @ 26° | 7.5 hrs. @ 120° | Hard, tough. |
| 10 | 5 | 0.1 | 7–70 hrs. @ 26° | 7.5 hrs. @ 120° | Do. |
| 11 | 7 | 0.14 | 7–70 hrs. @ 26° | 7.5 hrs. @ 120° | Do. |
| 12 | 9 | 0.18 | 7–70 hrs. @ 26° | 7.5 hrs. @ 120° | Hard. |
| 13 | 11 | 0.22 | 7–70 hrs. @ 26° | 7.5 hrs. @ 120° | Do. |
| 14 | 13 | 0.26 | 7–70 hrs. @ 26° | 7.5 hrs. @ 120° | Firm. |

[1] One drop of a 5 weight percent solution of benzyldimethylamine in ethyl acetate.
[2] One drop of a 12 weight percent solution of benzyldimethylamine in ethyl acetate.
[3] Plus an additional 6 hours at 160° C.

EXAMPLE 15

A mixture was prepared from 1.1 grams of divinylbenzene dioxide (74 weight percent purity), 0.5 gram of succinic anhydride, and 0.1 gram of glycerol. This mixture provided 1.0 carboxyl group of anhydride and 0.3 hydroxyl group of polyol per epoxy group. The resulting mixture was heated to 80° C. and maintained thereat for 5 hours. Gelation occurred after one minute at 80° C. A post cure then was effected at 100° C. for one hour plus an additional 6 hours at 160° C. Upon cooling to room temperature, a yellow, tough resin was obtained.

EXAMPLE 16

A mixture was prepared from 1.1 grams of divinylbenzene dioxide (74 weight percent purity), 0.49 gram of maleic anhydride, and 0.25 gram of 2,4,6-trimethylolphenyl allyl ether. This mixture provided 1.0 carboxyl group of anhydride and 0.3 hydroxyl group of polyol per epoxy group of diepoxide. The resulting mixture was heated to 80° C. and maintained thereat for 5 hours. Gelation occurred after 20 minutes at 80° C. A post cure then was effected at 100° C. for one hour plus an additional 6 hours at 160° C. Upon cooling to room temperature, an amber, tough resin having a Barcol hardness of 35 was obtained.

EXAMPLE 17

A mixture was prepared from 1.1 grams of divinylbenzene dioxide (74 weight percent purity) and 1.14 grams of 2,2'-bis(para-hydroxyphenyl) propane. This mixture provided 1.0 hydroxyl group per epoxy group. The resulting mixture was heated to 120° C. and maintained thereat for 15 hours plus an additional 6 hours at 160° C. Upon cooling to room temperature, a yellow, hard, brittle resin was obtained.

EXAMPLE 18

A mixture was prepared from 1.1 grams of divinylbenzene dioxide (74 weight percent purity), 0.26 gram of triethanolamine, and one drop of an aqueous solution containing 5.0 weight percent to $H_2SO_4$ catalyst (approximately 0.1 weight percent of $H_2SO_4$ catalyst based on the weight of diepoxide). This mixture provided 0.5 hydroxyl group per epoxy group. The resulting mixture was heated to 120° C. and maintained thereat for 8 hours with gelation occurring after the first 15 minutes. The temperature then was raised to 160° C. for an additional six hour period. Upon cooling to room temperature, an amber, tough resin having a Barcol hardness of 35 was obtained.

EXAMPLE 19

To 1.1 grams of divinylbenzene dioxide (74 weight percent purity) there was added one drop of an aqueous solution containing 5.0 weight percent of $H_2SO_4$ (approximately 0.1 weight percent of $H_2SO_4$ catalyst based on the weight of diepoxide). The resulting mixture was allowed to stand at room temperature, i.e., about 25° C., for 130 minutes after which period of time a viscous liquid was observed. This resulting viscous liquid was dissolved in 5.0 grams of methyl isobutyl ketone and an iron panel or strip was dipped into the resulting solution. The iron panel was removed almost immediately from this solution and then was baked at 160° C. for a period of 15 minutes. A thin coating was observed on that portion of the iron panel which was dipped into the methyl isobutyl ketone-containing solution. The resulting coating on the panel was glossy, pale-yellow, and tough. The coating displayed excellent adhesion and excellent acetone resistance. Efforts to scratch the coating, by hand, with a 9H Double Eagle pencil were futile.

EXAMPLE 20

Divinylbenzene dioxide (0.81 gram) of 65.8 weight percent purity was admixed with phthalic anhydride (0.74 gram) so as to provide a mixture containing 2.3 carboxyl groups of anhydride per epoxy group of diepoxide. This mixture was heated to 120° C. with gelation occurring after 37 minutes. The system was subsequently cured for a total of 5 hours at 120° C. plus 6 hours at 160° C. There was obtained an amber colored resin possessing a Barcol hardness of 27.

EXAMPLE 21

A mixture was prepared from 0.81 gram of divinylbenzene dioxide of 65.8 weight percent purity and 0.5 gram of succinic anhydride. The resulting mixture contained 1.5 carboxyl groups per epoxy group. The resulting mixture was heated to 120° C. and gelation occurred after 3 minutes. The resulting gel was cured for 6 hours at 160° C. There was obtained an amber colored, tough resin having a Barcol hardness of 0.

EXAMPLE 22

A mixture comprising 1.10 grams of divinylbenzene dioxide of 74 weight percent purity and 0.26 gram of glutaric acid was prepared. This mixture contained amounts of acid and diepoxide which provided 0.4 carboxyl group per epoxy group. The resulting mixture was heated to 100° C. for 60 minutes at which time gelation occurred. After a total cure of 5.5 hours at 100° C. plus 6 hours at 160° C., there was obtained a yellow colored, tough resin having a Barcol hardness of 35.

EXAMPLE 23

A mixture comprising 1.10 grams of divinylbenzene dioxide of 74 weight percent purity and 0.86 gram of an adduct of two mols of phthalic anhydride with 1 mol of ethylene glycol (neutralization equivalent of 145) was prepared. This mixture contained amounts of diepoxide and adduct which provided 0.4 carboxyl group per epoxy group. The resulting mixture was heated to 100° C. and maintained thereat for 5.5 hours. Gelation occurred after two minutes at this temperature. After a post cure for 6 hours at 160° C., there was obtained a yellow colored, slightly brittle resin.

EXAMPLE 24

A mixture was prepared from 2.7 grams of divinylbenzene dioxide (60 weight percent purity) and 1.0 gram of p,p'-methylenedianiline. This mixture provided one amino hydrogen per epoxy group. This mixture was heated to a temperature below about 120° C. until homogeneous, and subsequently maintained for 2 hours at 120° C. plus 6 hours at 160° C. A gel was observed after 29 minutes at 120° C. An amber colored, tough resin having a Barcol hardness of 54 was obtained.

EXAMPLE 25

A mixture was prepared from 2.91 grams of divinylbenzene dioxide of 84.2 weight percent purity and 1.5 grams of an addition product of 4 mols of diethylenetriamine with 1.0 mol of diglycidyl ether of 2,2-bis(4-hydroxyphenyl)propane. This mixture contained proportions of addition product and diepoxide providing one amino hydrogen per epoxy group. This mixture gelled in 4 hours at 26° C. The mixture was maintained at 26° C. for 4,5 hours; at 120° C. for 0.25 hour; and at 160° C. for 6 hours. There was obtained an amber colored resin having a Barcol hardness of 60 to 26° C. At 120° C., this resin had a Barcol hardness of 20.

Reasonable variations and modifications of this invention can be made or carried out in the light of the above disclosure without departing from the spirit and scope thereof.

What is claimed is:

1. A curable composition comprising divinylbenzene dioxide and a catalyst selected from the group consisting of strong mineral acids, sulfonic acids, metal halide Lewis acids, alkali metal hydroxides, quaternary ammonium hydroxides, and tertiary amines.
2. The composition of claim 1 wherein the concentration of said catalyst is in the range of from about 0.005 to about 25.0 weight percent, based on the weight of said divinylbenzene dioxide.
3. A solid homopolymer of divinylbenzene dioxide.
4. A thermosetting intermediate reaction product obtained under the influence of heat and by the partial reaction of a composition comprising divinylbenzene dioxide and a catalyst selected from the group consisting of strong mineral acids, sulfonic acids, metal halide Lewis acids, alkali metal hydroxides, quaternary ammonium compounds, and tertiary amines.
5. The composition of claim 4 wherein said thermosetting intermediate reaction product is dissolved in an inert organic solvent, the resulting solution comprising from about 10 to 90 weight percent of said intermediate reaction product, based on the total weight of said intermediate reaction product and said solvent.
6. A curable composition divinylbenzene dioxide and a strong mineral acid catalyst.
7. A curable composition comprising divinylbenzene dioxide and sulfonic acid catalyst.
8. A curable composition comprising divinylbenzene dioxide and a metal halide Lewis acid catalyst.
9. A curable composition comprising divinylbenzene dioxide and an alkali metal hydroxide catalyst.
10. A curable composition comprising divinylbenzene dioxide and a quaternary ammonium catalyst.
11. A curable composition comprising divinylbenzene dioxide and a tertiary amine catalyst.
12. A curable composition comprising divinylbenzene dioxide and from about 0.005 to 25.0 weight percent, based on the weight of said divinylbenzene dioxide, of potassium hydroxide catalyst.

References Cited in the file of this patent

UNITED STATES PATENTS

| | | |
|---|---|---|
| 1,976,678 | Wittiner | Oct. 9, 1934 |
| 2,706,182 | Pruitt et al. | Apr. 12, 1955 |
| 2,706,189 | Pruitt et al. | Apr. 12, 1955 |
| 2,792,375 | Bartleson | May 14, 1957 |

OTHER REFERENCES

Everett et al.: J. Chem. Soc. (1950), pages 3131–3135.